UNITED STATES PATENT OFFICE.

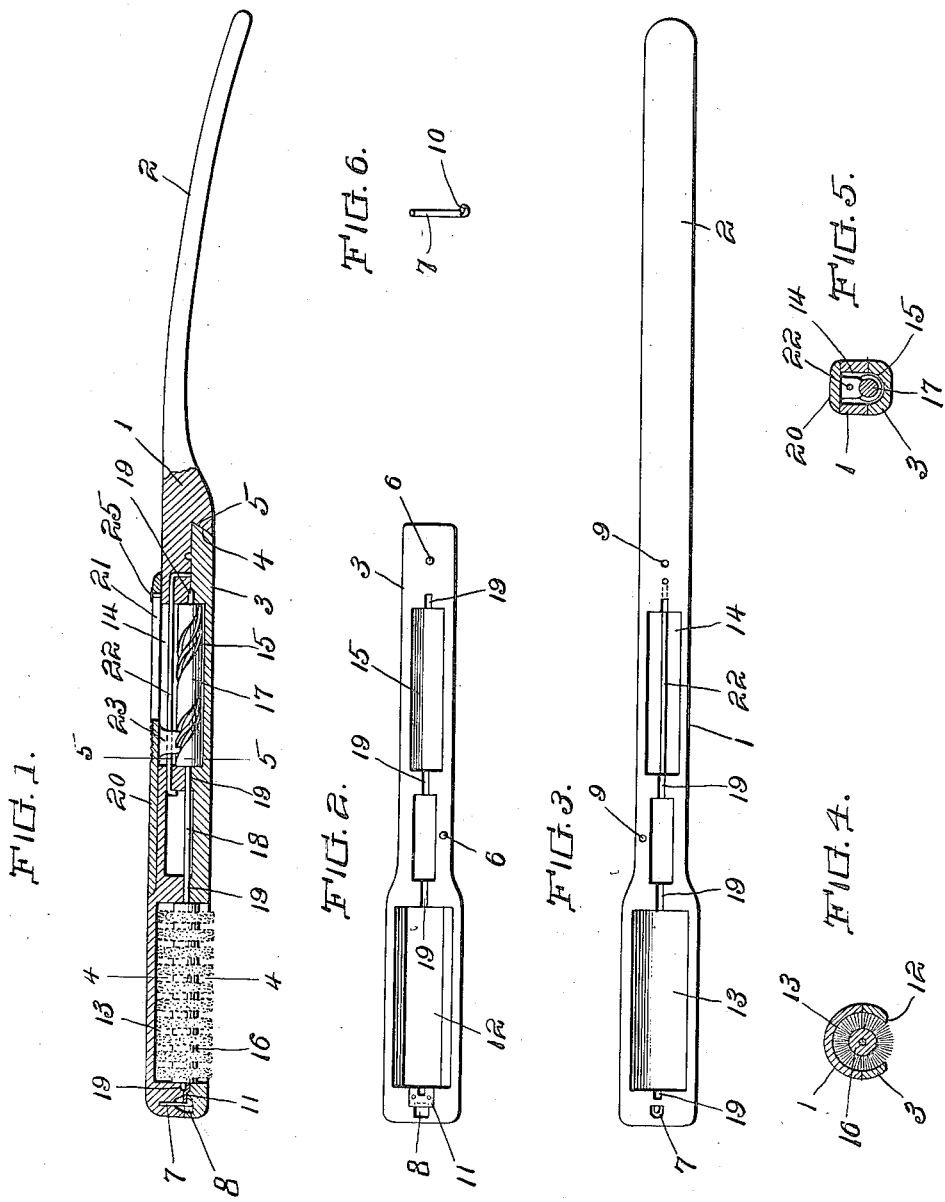

WILLIAM J. DOSSEY, OF GLASGOW, KENTUCKY.

ROTARY TOOTH-BRUSH.

1,226,482.　　　　　Specification of Letters Patent.　　Patented May 15, 1917.

Application filed September 13, 1916.　Serial No. 119,931.

*To all whom it may concern:*

Be it known that I, WILLIAM J. DOSSEY, a citizen of the United States, residing at Glasgow, in the county of Barren and State of Kentucky, have invented new and useful Improvements in Rotary Tooth-Brushes, of which the following is a specification.

This invention is an improved rotary tooth brush, the object of the invention being to provide a tooth brush which embodies a brush head mounted for oscillation and also embodies an operating member mounted for reciprocating movement and which serves to impart rotary motion to the brush head so that when the brush is used, it serves to effectually brush on and between the teeth.

The invention consists in the features of construction, combination, and arrangement of devices, hereinafter fully described and claimed.

In the accompanying drawings:—

Figure 1 is partly an elevation and partly a longitudinal sectional view of a rotary tooth brush constructed and arranged in accordance with my invention.

Fig. 2 is an inverted plan of the removable member.

Fig. 3 is a similar view of the handle with the removable member removed.

Fig. 4 is a detailed transverse sectional view taken on the plane indicated by the line 4—4 of Fig. 1.

Fig. 5 is a similar view taken on the plane indicated by the line 5—5 of Fig. 6.

Fig. 6 is a detailed elevation of the catch.

The handle 1 of my improved tooth brush is here shown as having a curved outer portion 2, and as provided on its inner side and at the inner end with a removable member 3 which is fitted in a recess with which the handle is formed and the inner end of which removable member is beveled as at 4 and engages a correspondingly beveled shoulder 5 of the handle. The removable member is provided near its inner end on its inner side with a dowel 6 which enters an opening 9 in the opposing portion of the handle. Near the outer end of the removable member, on its inner side is a spring keeper bar, the free end of which projects into a recess 8. The handle is provided near its outer end with a spring catch 7 which has a notch 10 to engage the spring. Hence the member 3 is detachably secured to the handle and may be readily removed therefrom when desired. The member 3 is provided with an oblong rectangular opening 12.

The handle has a recess 13 which registers with the opening 12 and also has a recess 14 which registers with a corresponding recess 15, in the inner side of the detachable member 3. The brush head embodies a cylinder 16 which is fitted partly in the recess 13 and partly in the opening 12 and also embodies bristles 16 which project outwardly from said cylinder through the opening 12. The width of said opening is such as to permit the passage of the bristles therein and from side to side thereof. A worm 17 is arranged partly in the recess 14 and partly in the recess 15 and is connected to the brush head by a shaft 18 which is fitted detachably in bearings 19 in the opposing sides of the handle and removable member.

An operating slide 20 is mounted on the back of the handle for longitudinal movement and has a slot 21 which is engaged by a stud 25 that projects outwardly from the back of the handle. A guide rod 22 has its ends secured to the handle and said guide rod extends longitudinally of the opening or recess 14 and passes through an opening in a tooth 23 which projects inwardly from the operating slide and engages the spiral thread of the worm.

By moving the operating slide back and forth, its tooth and the worm coact to impart reverse rotary movement to the brush head as will be understood. Hence the brush may be employed to effectually brush on and between the teeth and to thereby thoroughly clean the same as will be understood.

By first removing the detachable member 3 of the handle, the brush head, together with its shaft and worm may be also readily removed and hence all parts of the brush may be readily kept thoroughly clean.

From the foregoing description, taken in connection with the accompanying drawings, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the claims appended hereto.

Having described the invention, what is claimed is:

1. In a brush of the class described, a handle comprising a relatively fixed member and a removable member, a brush head mounted for oscillating movement and arranged with its bearings between the handle and the removable member, and an operating member mounted for reciprocating movement on the handle, said operating member and said brush head being provided with means to cause the brush head to be oscillated when said operating member is moved.

2. In a brush of the class described, a handle, a removable member for the handle, a brush head, a worm, a shaft connecting the brush head and worm, bearings for said shaft in the opposing sides of the handle and removable member, and an operating member mounted for reciprocating movement on the handle and engaged with said worm.

In testimony whereof I affix my signature.

WILLIAM J. DOSSEY.